United States Patent [19]
Webb

[11] 4,192,054
[45] Mar. 11, 1980

[54] RAILROAD ROLLER BEARING PULLER

[76] Inventor: Jack E. Webb, 3530 Hawthorne Rd., Pocatello, Id. 83201

[21] Appl. No.: 953,893

[22] Filed: Oct. 17, 1978

[51] Int. Cl.² .......................................... B23P 19/02
[52] U.S. Cl. ................................................... 29/252
[58] Field of Search ........................... 29/252, 802, 803

[56] References Cited

U.S. PATENT DOCUMENTS

| | | | |
|---|---|---|---|
| 2,906,012 | 9/1959 | Rothfuchs et al. | 29/252 |
| 2,934,819 | 5/1960 | Sorensen | 29/252 |
| 3,073,017 | 1/1963 | Reed et al. | 29/252 |
| 3,995,361 | 12/1976 | Scheller et al. | 29/252 |

*Primary Examiner*—James L. Jones, Jr.
*Attorney, Agent, or Firm*—Clarence A. O'Brien; Harvey B. Jacobson

[57] ABSTRACT

An overhead mount is provided for disposition over a section of track along which railroad axle/wheel assemblies may be rolled and an elongated horizontal support structure for disposition transverse to the aforementioned track section is adjustably suspended, at its opposite ends, from the overhead mount. A pair of followers are mounted on the support structure for guided movement therealong and first motor structure is provided for adjustably varying the spacing between the followers. A pair of opposing abutments are dependingly supported from the followers for engaging the remote ends of stub axle portions of axle/wheel assemblies and wheel bearing engaging and pulling fixtures are supported from the abutments for shifting relative thereto toward and away from each other. Second motor structure is operatively connected between each abutment and the corresponding fixture for controllably inversely shifting the abutments toward and away from each other relative to the fixtures. By this construction, the roller bearing wheel assemblies on the opposite ends of a railroad axle/wheel assembly may be simultaneously pulled.

12 Claims, 12 Drawing Figures

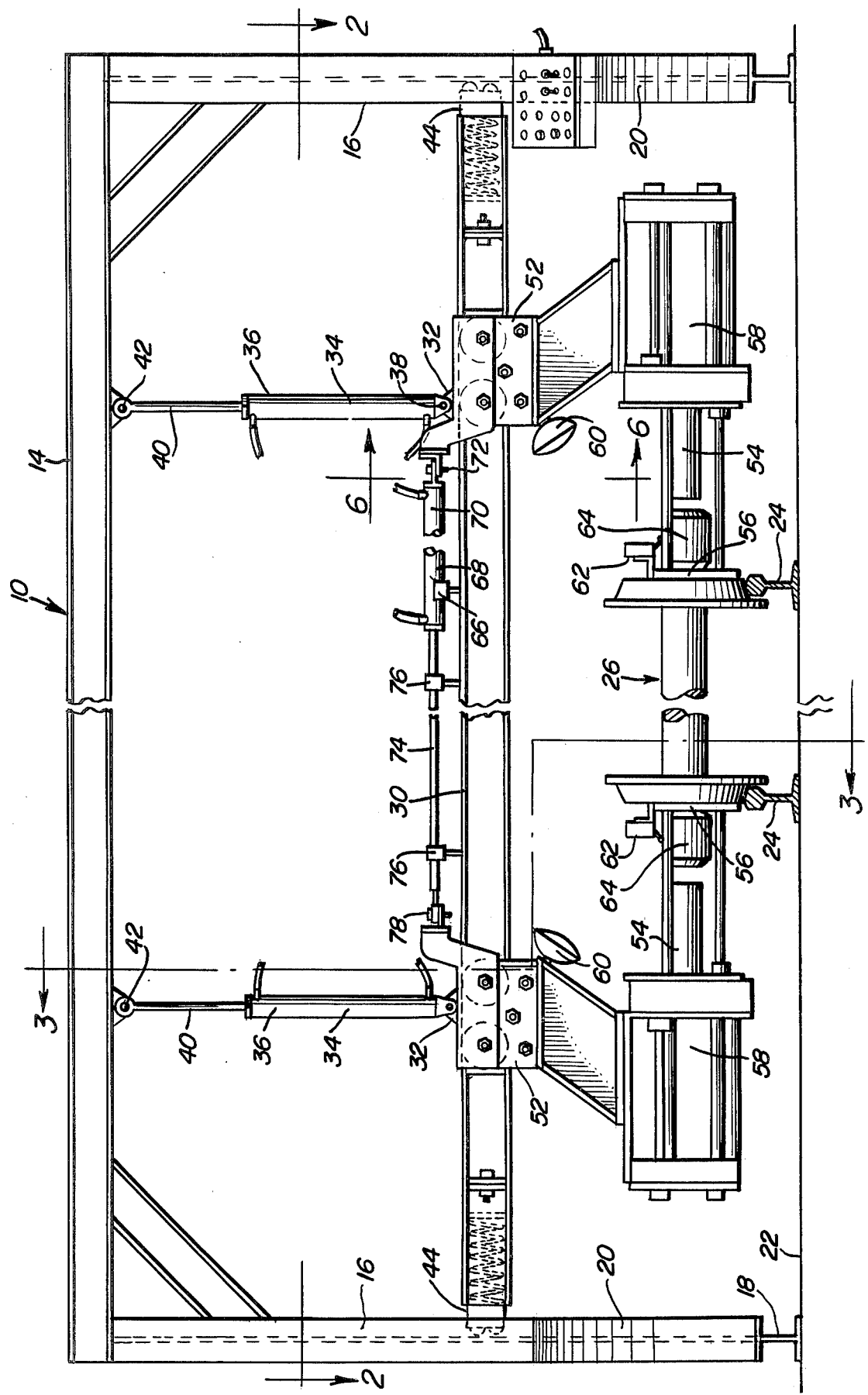

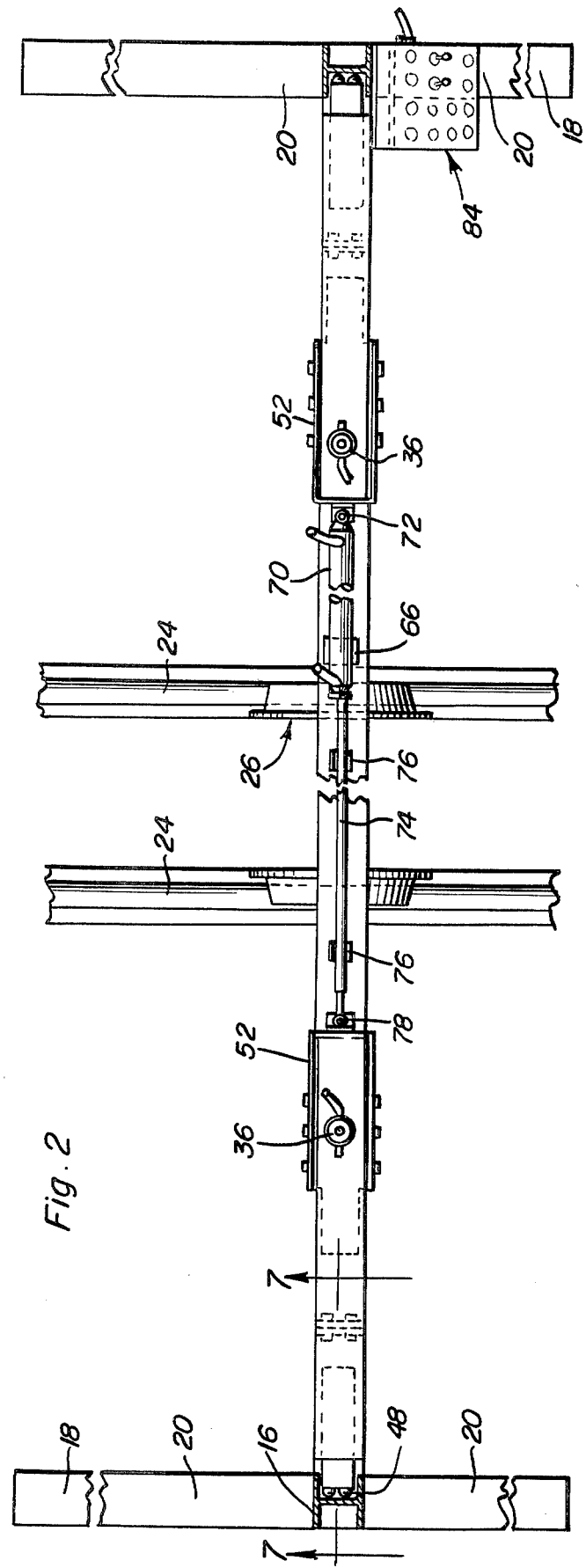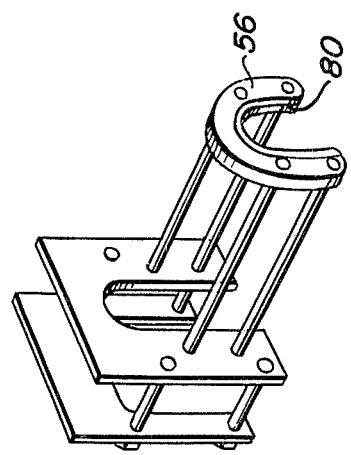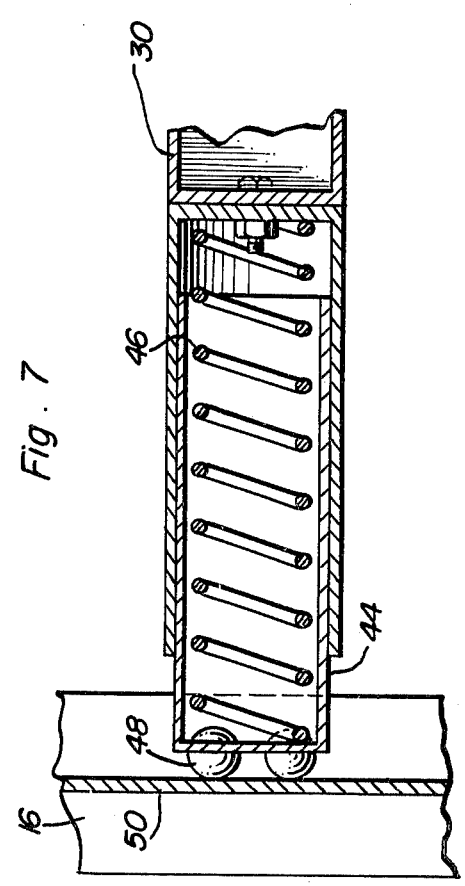

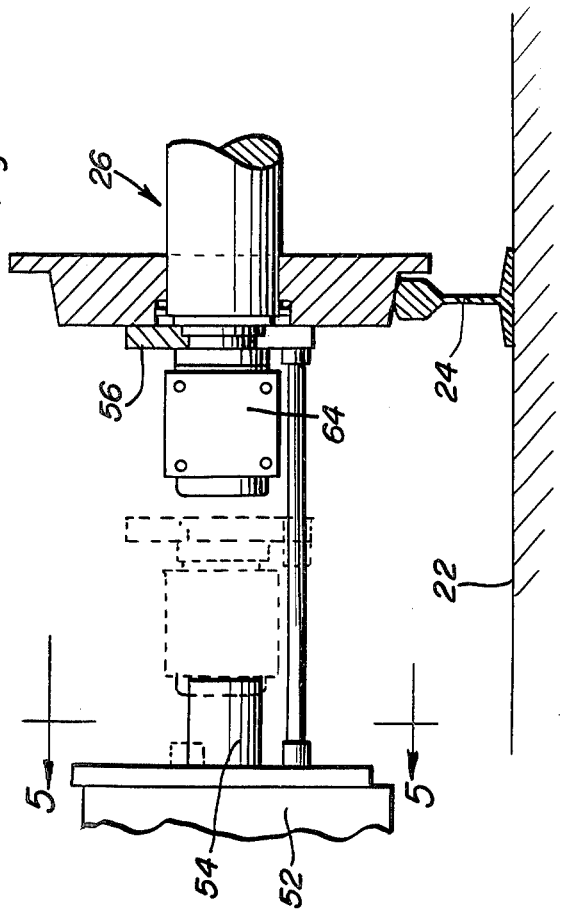
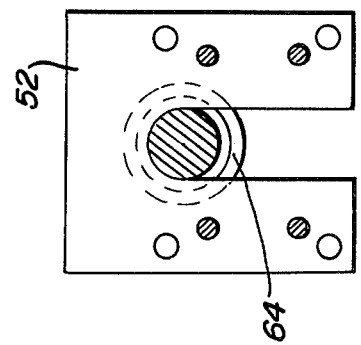
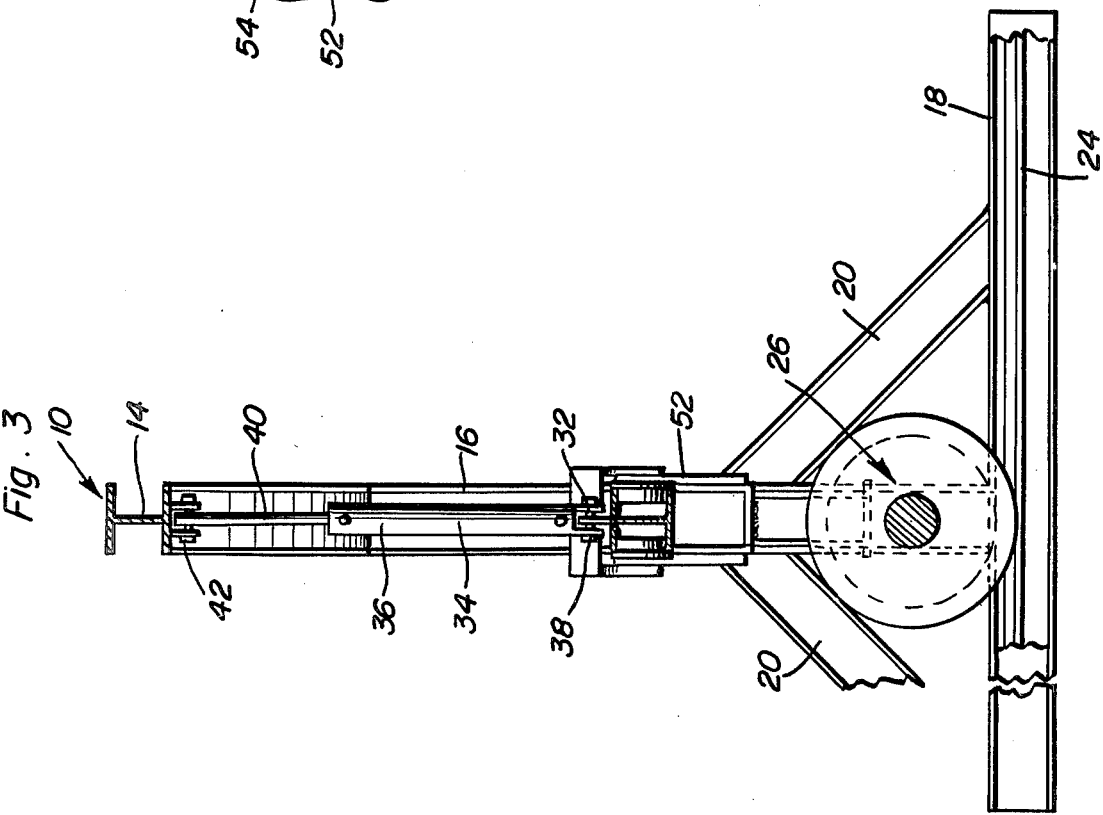

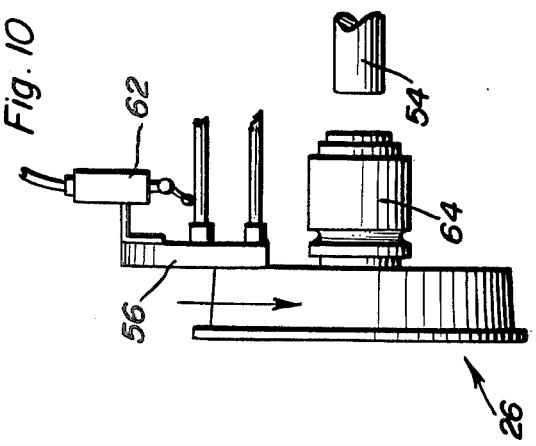
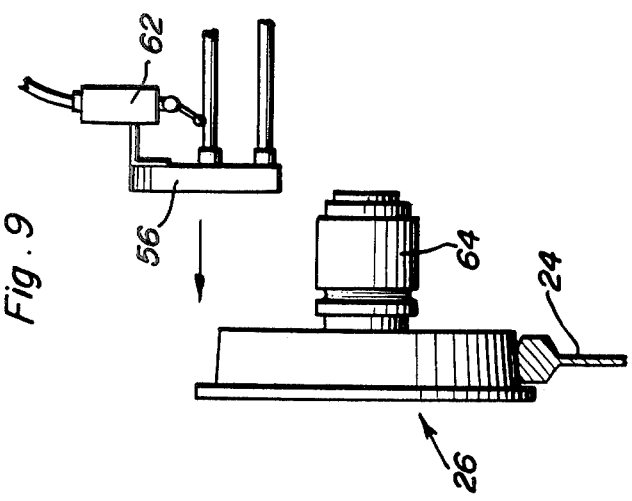
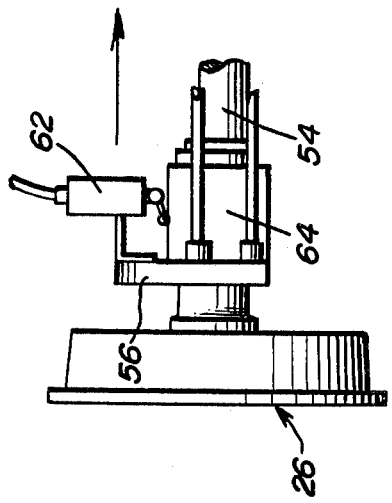
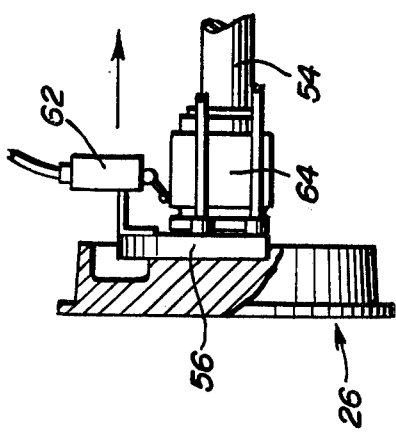
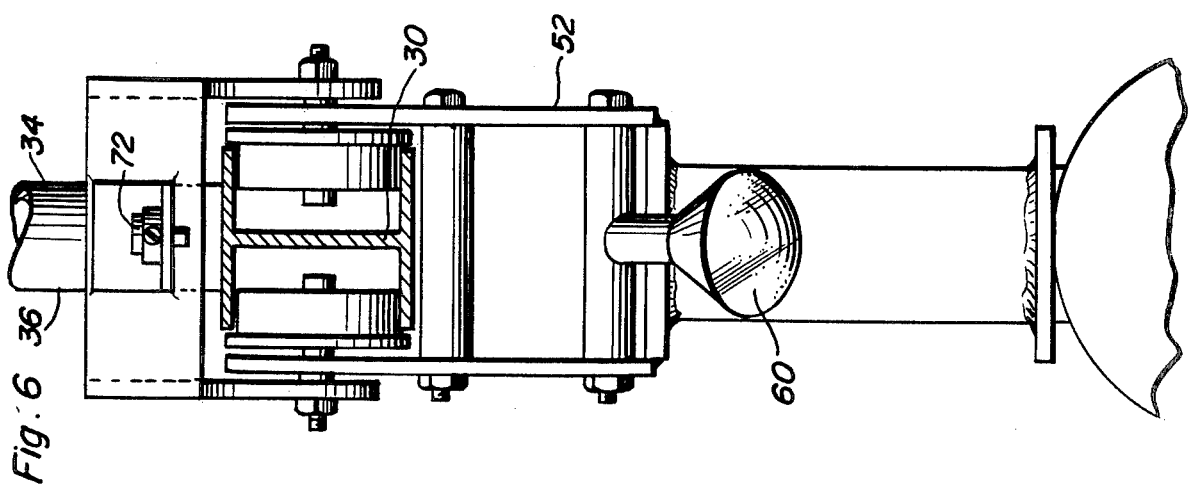

RAILROAD ROLLER BEARING PULLER

BACKGROUND OF THE INVENTION

There are numerous railroad shops in this country in which railroad axle/wheel assemblies have their bearings serviced by removal and replacement of the bearings with either new or reconditioned bearings. The task of pulling heavy-duty roller axle bearing assemblies from the opposite end stub axle portions of railroad axle/wheel assemblies is time consuming and requires considerable labor. Accordingly, the production volume of repair centers specifically designed to provide railroad car service including the replacement of the axle/wheel assembly bearings is not as high as it should be. Therefore, a need exits for an apparatus whereby railroad axle/wheel assemblies may have the roller bearing assemblies readily removed therefrom in order that new or rebuilt wheel assemblies may be reinstalled thereon.

Various forms of wheel bearing puller assemblies have been heretofore designed and some have been specifically designed for use in pulling railroad wheel bearings. However, these previously known forms of wheel bearing structures are not capable of high volume production.

Examples of typical forms of wheel bearing pullers including some of the structural and operational features of the instant invention are disclosed in U.S. Pat. Nos. 1,196,963, 2,878,559, 2,906,012, 3,103,064, 3,713,198, 3,916,499 and 3,995,361.

BRIEF DESCRIPTION OF THE INVENTION

The railroad wheel bearing puller of the instant invention has been specifically designed for high volume removal of roller bearing assemblies from the opposite stub axle ends of railroad axle/wheel assemblies. The puller is constructed in a manner whereby both opposite end roller bearing assemblies may be pulled simultaneously from an associated railroad axle/wheel assembly and the puller may be operated by a single person so as to thereby result in considerable savings of work hours.

The main object of this invention is to provide a railroad axle/wheel assembly bearing puller which will be capable of high volume production.

Another object of this invention is to provide a wheel bearing puller in accordance with the preceding object and which will be capable of simultaneously pulling the roller bearing assemblies from the opposite stub axle ends of railroad axle/wheel assemblies.

Another very important object of this invention is to provide a bearing puller which will be capable of being operated by a single workman.

A final object of this invention to be specifically enumerated herein is to provide a railroad wheel bearing puller in accordance with the preceding objects and which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary elevational view of the wheel bearing puller of the instant invention;

FIG. 2 is a fragmentary horizontal sectional view taken substantially upon the plane indicated by the section line 2—2 of FIG. 1;

FIG. 3 is a fragmentary vertical sectional view taken substantially upon the plane indicated by the section line 3—3 of FIG. 1;

FIG. 4 is an enlarged fragmentary vertical sectional view illustrating the manner in which one of the bearing engaging and pulling fixtures may be operatively engaged with a bearing to be pulled;

FIG. 5 is a vertical sectional view taken substantially upon the plane indicated by the section line 5—5 of FIG. 4;

FIG. 6 is a fragmentary enlarged vertical sectional view taken substantially upon the plane indicated by the section line 6—6 of FIG. 1;

FIG. 7 is a fragmentary enlarged vertical sectional view taken substantially upon the plane indicated by the section line 7—7 of FIG. 2;

FIG. 8 is a fragmentary perspective view of one of the wheel bearing engaging and pulling fixtures; and FIGS. 9 through 12 comprise fragmentary elevational views illustrating the manner in which one of the wheel bearing engaging and pulling fixtures is advanced toward and moved into engagement with a wheel bearing to be pulled and thereafter actuated to pull the associated wheel bearing.

DETAILED DESCRIPTION OF THE INVENTION

Referring now more specifically to the drawings, the numeral 10 generally designates the wheel bearing puller of the instant invention. The puller 10 includes an elongated horizontal overhead mount 14 whose opposite ends are supported from and braced relative to a pair of upstanding I beams 16, the lower ends of the I beams 16 being mounted on horizontal floor engaging beams 18 relative to which the lower ends of the I beams 16 are braced by means of inclined braces 20. The floor 22 beneath the mount 14 has a pair of railroad rails 24 supported therefrom along which dismounted railroad axle/wheel assemblies referred to in general by the reference numeral 26 may be rolled. The rails 24 are disposed at generally right angles to the elongated mount 14 and an elongated horizontal support structure 30 extends between the I beams 16. Opposite end portions of the support structure 30 include mounting ears 32 to which the lower cylinder ends 34 of a pair of double acting extendible and retractable fluid motors 36 are pivotally attached as at 38. The upper piston ends 40 of the fluid motors 36 are pivotally attached as at 42 to opposite end portions of the horizontal mount. Accordingly, the fluid motors 36 may be utilized to raise and lower the support structure 30. The opposite ends of the support structure 30 include telescopingly supported members 44 which may be extended and retracted relative to the opposite ends of the support structure 30. The telescopic members 44 are spring biased toward extended positions by means of compression springs 46 operatively connected between the opposite ends of the support structure 30 and the telescoping members 44 and the remote ends of the latter include journaled bearing members 48 which rollingly engage the corresponding web portions 50 of the I beams 16 and therefore tend of maintain the support structure 30 centered between the I beams 16.

A pair of followers in the form of roller equipped dollies 52 are mounted on the support structure for guided movement therealong and each of the dollies 52 includes an abutment 54 for opposing and engaging the outer end of a corresponding railroad axle/wheel assembly end. Further, the dollies 52 have axle/wheel bearing engaging and pulling yokes 56 stationarily supported therefrom for movement toward and away from each other during similar movement of the dollies 52. The abutments 54 are shiftably supported from the dollies 52 and reversible fluid motors (cylinders) 58 are operatively connected between the abutments 54 and the corresponding dollies 52 whereby the abutments 54 may be extended and retracted toward and away from each other relative to the corresponding fixtures 56. The dollies 52 include illumination means 60 to assist in viewing the work and each of the fixtures 56 mounts a limit switch 62 therefrom for controlling the operation of the corresponding fluid motor 36.

Each railroad axle/wheel assembly includes a pair of opposite end roller bearing assemblies 64 mounted on opposite end stub axle portions of the assembly 26 and the job to be performed comprises axially pulling the wheel bearing assembly 64 from the corresponding stub axle end portions of the assembly 26.

The support structure 30 includes a saddle 66 which upwardly slidably cradles one end portion of the cylinder portion 68 of an extendible and retractable fluid motor 70 and the other end of the cylinder portion of the fluid motor 70 is pinned as at 72 to the right hand dolly 52 as viewed in FIG. 1. The fluid motor 70 includes an extendible and retractable piston rod portion 74 reciprocally and guidingly received through sleeve bearings 76 supported from the support structure 30 and the free end of the piston rod portion 74 is pinned as at 78 to the left hand dolly 52. Accordingly, upon extension and retraction of the fluid motor 70, the dollies 52 will be moved toward and away from each other, respectively, relative to the support structure 30.

With attention now invited more specifically to FIG. 8 of the drawings, it may be seen that each fixture 56 includes a removable and replaceable shoe 80 adapted for workingly engaging a particular type and size of wheel bearing assembly and a control panel assembly referred to in general by the reference numeral 84 is supported from the right hand lower I beam bracing member 20 as seen in FIGS. 1 and 2.

In operation, the fluid motors 36, 70 and 58 are connected to a suitable source of hydraulic fluid under pressure through the control assembly 84. Initially, assuming that the dollies 52 have been retracted away from each other, that the support structure 30 has been raised and that the cylinders 58 have been retracted, the puller 10 is initially actuated after the assembly 26 has been rolled into predetermined position beneath the support structure 30. At that time, the fluid motor 70 is actuated, through the control panel assembly 84, so as to be retracted whereby dollies 52 and the fixtures 56 are moved toward each other in the direction of the arrow illustrated in FIG. 9 into position with the fixtures 56 engaging the upper peripheral portions of the outer sides of the wheels of the assembly 26, see FIG. 10. Thereafter, the cylinders 36 are actuated so as to be extended, whereby the support structure 30 is lowered and the fixtures 56 move downwardly in the direction of the arrow in FIG. 10 to automatically engage the fixtures 56 behind the inner end of the associated wheel bearing assembly 64. The limit switches 62 carried by the fixtures 56 are operatively connected (in any convenient well-known manner) to the control assembly 84 for terminating extension of the fluid motors 36 as the limit switches 62 engage the weel bearing assemblies 64. Accordingly, the fixtures 56 terminate their downward movement automatically as they are properly positioned behind the inner ends of the wheel bearing assemblies 64. Thereafter, the cylinders 58 are actuated whereby the abutments 54 are extended relative to the fixtures 56 in order to pull the wheel bearing assemblies 64 from the assembly 26, termination of previous actuation of the cylinder or fluid motor 70 having relieved the motor 70 of fluid under pressure and opened the necessary valves (not shown) thereto to allow the motor to be extended by actuation of the cylinders 58 to move the dollies 52 and fixtures 56 apart. Thus, the puller 10 is operative to simultaneously pull both the wheel bearing assembly 64 from the assembly 26.

If it is desired, other types of supports may be utilized for supporting the mount 14 in elevated position above the floor. However, it is desirous that any form of support utilized for this purpose be provided with the equivalent of the vertical I beams 64 whereby the rollers 48 carried by the telescoping members 44 may be rollingly guidingly engaged by the web portions of such corresponding I beams.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A railroad wheel bearing puller for pulling the bearings from both ends of an axle/wheel assembly of the type including a pair of opposite end stub axle portions upon which the bearings to be pulled are mounted and which project outwardly from the remote sides of the wheels of said assembly, said puller including an overhead mount for disposition over a section of track along which axle/wheel assemblies may be rolled, an elongated horizontal support structure for disposition transverse to said track section, suspension means adjustably suspending opposite end portions of said support structure from said mount, a pair of followers mounted on said support structure for guided movement therealong, first motor means adjustably varying the spacing between said followers, a pair of opposing wheel bearing engaging and pulling fixtures dependingly supported from said followers and axle end engaging abutments supported from said followers for shifting relative thereto toward and away from each other, and second motor means operatively connected between each follower and the corresponding abutment for controllably inversely shifting said abutments toward and away from each other relative to said fixtures.

2. The combination of claim 1 wherein said first motor means comprises hydraulic cylinder means operatively connected between said followers.

3. The combination of claim 1 wherein said suspension means includes a pair of upright extendible and retractable fluid motors connected between said mount and the opposite end portions of said support structure.

4. The combination of claim 1 wherein said fixture includes shoe means defining a downwardly opening generally U-shaped notch in which to receive the upper peripheral portion of a stub axle portion inwardly of a wheel bearing mounted on the outer end thereof.

5. The combination of claim 4 wherein said shoe means is replaceably supported from said fixture.

6. The combination of claim 5 wherein said fixtures include surface portions for abuttingly engaging the remote outer surfaces of the upper peripheral portions of the wheels of an axle/wheel assembly to position said shoe means in vertical registry with the corresponding stub axle portions immediately inwardly of the corresponding bearings to be pulled.

7. The combination of claim 1 wherein said overhead mount includes a pair of horizontally spaced apart upstanding support members therefor, said support members including means defining upstanding guide structures, said support structure extending horizontally between and guidingly engaged with said guide structures for guided movernent therealong.

8. The combination of claim 7 wherein said guide structures define opposing guide surfaces, the opposite ends of said support structure including rotatably supported followers rollingly engaged with said guide surfaces.

9. The combination of claim 8 wherein said rotatably supported followers are journalled from spring biased extendible end sections of said support structure.

10. The combination of claim 9 wherein said suspension means includes a pair of upright extendible and retractable fluid motors connected between said mount and the opposite end portions of said support structure.

11. The combination of claim 10 wherein said fixture includes shoe means defining a downwardly opening generally U-shaped notch in which to receive the upper peripheral portion of a stub axle portion inwardly of a wheel bearing mounted on the outer end thereof.

12. The combination of claim 11 wherein said shoe means is replaceably supported from said fixture.

* * * * *